(12) United States Patent
Badovinatz et al.

(10) Patent No.: US 6,910,080 B2
(45) Date of Patent: Jun. 21, 2005

(54) COMMUNICATION EFFICIENCY AND PERFORMANCE IN AN UNRELIABLE COMMUNICATION ENVIRONMENT

(75) Inventors: Peter R. Badovinatz, Beaverton, OR (US); Myung M. Bae, Pleasant Valley, NY (US); Jifang Zhang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 09/993,990

(22) Filed: Nov. 6, 2001

(65) Prior Publication Data

US 2003/0088692 A1 May 8, 2003

(51) Int. Cl.[7] .............................................. G06F 15/16
(52) U.S. Cl. .................................................... 709/234
(58) Field of Search ............................... 709/234, 227, 709/230, 237; 714/7, 18, 249

(56) References Cited

U.S. PATENT DOCUMENTS

| | | | |
|---|---|---|---|
| 5,671,226 A | * 9/1997 | Murakami et al. | 370/474 |
| 5,784,184 A | * 7/1998 | Alexander et al. | 398/91 |
| 5,918,002 A | * 6/1999 | Klemets et al. | 714/18 |
| 6,018,516 A | 1/2000 | Packer | 370/231 |
| 6,097,731 A | 8/2000 | Aoki | 370/465 |
| 6,112,323 A | 8/2000 | Meizlik et al. | 714/748 |
| 6,292,834 B1 | * 9/2001 | Ravi et al. | 709/233 |
| 6,553,032 B1 | * 4/2003 | Farley et al. | 370/394 |
| 6,560,630 B1 | * 5/2003 | Vepa et al. | 718/105 |
| 6,766,358 B1 | * 7/2004 | Chesson et al. | 709/213 |

FOREIGN PATENT DOCUMENTS

| | | | |
|---|---|---|---|
| EP | 0969623 A2 | 1/2000 | H04L/1/16 |
| EP | 1077559 A1 | 2/2001 | H04L/12/56 |
| JP | 4082436 A | 3/1992 | H04L/12/40 |
| JP | 5028072 A | 2/1993 | G06F/13/00 |
| JP | 6197100 A | 7/1994 | H04L/1/16 |
| JP | 9186739 A | 7/1997 | H04L/29/08 |
| JP | 10247901 A | 9/1998 | H04L/1/18 |
| WO | 0079721 A2 | 12/2000 | H04L/1/00 |

OTHER PUBLICATIONS

Han et al., "Experimental Evaluation of Failure–Detection Schemes in Real–time Communication Networks," Digest of Papers, Twenty–Seventh Annual International Symposium on Fault–Tolerant Computing, Seattle, WA, Jun. 24–27, 1997.

Rhee et al., "MTCP: Scalable TCP–like Congestion Control for Reliable Multicast," IEEE INFOCOM '99, Conference on Computer Communications, Eighteenth Annual Joint Conference of the IEEE Computer and Communications Societies, The Future is Now, vol. 3, pp 1265–1273, 1999.

Blackmore et al., Pending U.S. Appl. No. 09/619,054, filed Jul. 18, 2000.

Tanenbaum, S., "Computer Networks," The Transport Layer, Jan. 15, 1996, ISBN 0–13–394248–1, pp. 536–542, XP–002233582.

Jacobs, et al., "Real–time Video on the Web Using Dynamic Rate Shaping," IEEE, ISBN 0–8186–8183–7, Oct. 26, 1997, pp. 14–17.

* cited by examiner

*Primary Examiner*—David Y. Eng
(74) *Attorney, Agent, or Firm*—Lawrence D. Cutter

(57) ABSTRACT

In a multinode data processing system, the messages to be transmitted from node to node, per the request of an application program, are stored in a queue on one of the nodes. Acknowledgment of the receipt of the messages is used to control transmission of messages at future times by adjusting the maximum number of allowable messages to be sent from the queue and also by adjusting the time interval that the system waits before retransmitting unacknowledged messages. This permits the use of so-called "unreliable" messaging protocols and relieves application programs and programmers from the burden of employing more complicated protocols.

7 Claims, 1 Drawing Sheet

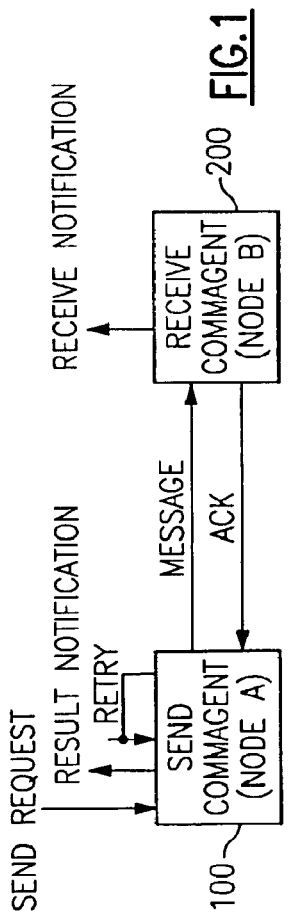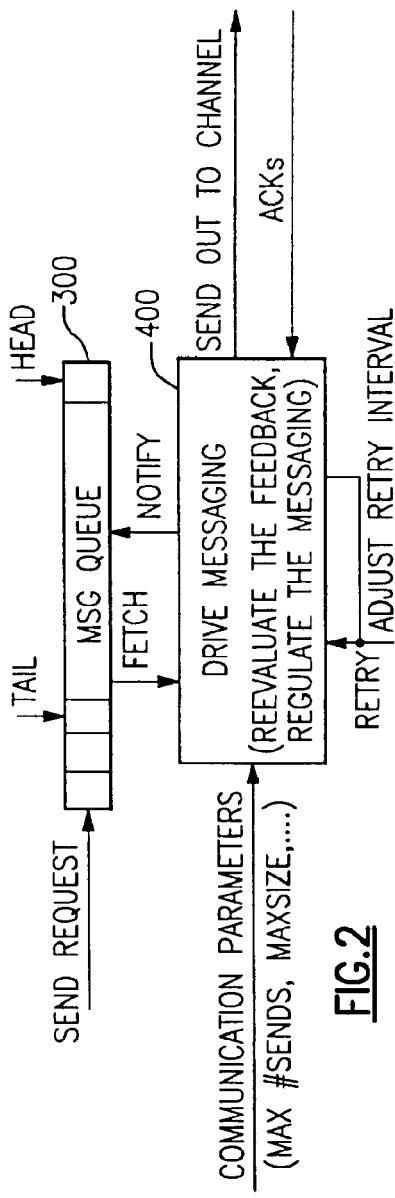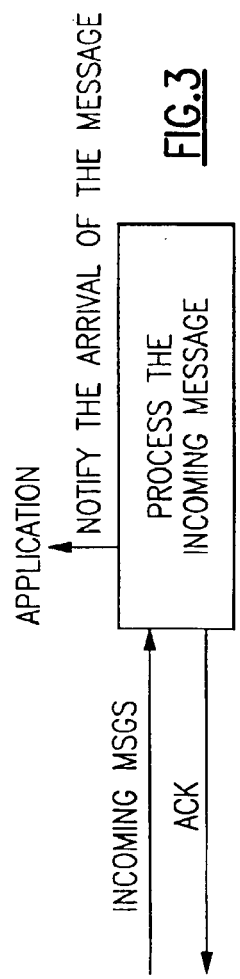

COMMUNICATION EFFICIENCY AND PERFORMANCE IN AN UNRELIABLE COMMUNICATION ENVIRONMENT

BACKGROUND OF THE INVENTION

The present invention is generally directed to methods and systems for communication in a data processing network in which data transmission demands between the nodes in the network can cause a reduction in capacity as a result of the retransmission of lost messages. More particularly, the present invention is directed to a system and method for adapting message transmission rates to more closely match the current network capacity. Even more particularly, the present invention employs a message queue together with a message driver which periodically reevaluates the capacity of the network based on a comparison of the number of messages sent versus the number of acknowledgments received.

Some communication methods like UDP (User Data Protocol) are generally considered to be basically "unreliable". Unlike TCP (Transmission Control Protocol), which is a "reliable" protocol, a UDP message may not ever reach its final destination and it can be dropped or removed by the source node, or by intermediate nodes, or it can be missing anywhere along the communication path. The message can even be silently removed at a destination node without any notification that one of the message packets is missing. (It is noted that the terms "unreliable protocol" and "reliable protocol" are relative terms employed herein to more particularly distinguish two different categories of transmission protocols; the use of these terms is not meant to suggest that one should not use so-called "unreliable protocols". To the contrary, improvements provided herein make such "unreliable" protocols much more practical by eliminating many of their disadvantages, while still preserving the advantages associated with their lack of complexity and overhead.)

Because of the "unreliable" message delivery qualities associated with simpler protocols, application programs often must themselves implement many features of a transmission protocol—acknowledgment from the other end, time-out, retransmission, etc., so that the application program can determine for itself whether the intended messages are ever delivered. However, simple retransmission often causes more communication traffic which then results in the message drop rate becoming even higher. This is an especially vulnerable time for the network since it is at these times that the communication channel is already likely to be saturated (that is, it is near, at or beyond its capacity).

This problem is greatly amplified when one considers an environment in which there are a large number of distributed data processing nodes. When a distributed application running on one node sends large messages to peer applications running on many different nodes using the UDP protocol, it is very likely that many messages end up as being dropped, which means that they have to be retransmitted. Typically, this retransmission occurs only a short time thereafter, when the network is still saturated with messages. As a result of this situation, it can happen in some cases that an application program running on one of the nodes spends most of its time retransmitting messages rather than performing its other designed-for tasks. As an example, on a heavily loaded large system with more than 500 nodes, if there are a large number of messages which are sent out from one node to the other 500 nodes, it is quite possible that many of the messages will have to be retransmitted several times. Therefore, it is very important to control message flow. One way of accomplishing this, as presented herein, is by regulating the number and size of messages sent and by retransmitting the messages more intelligently.

In sum, there are several problems solved through the use of the present invention. For example, the present invention permits the transmission of bulk messages to many peers without significantly impacting the message drop rate and without causing significant numbers of message retransmissions. This is a particular problem since unintelligent message retransmission methods cause more communication traffic, increase the message drop rate, and slow application performance.

The present invention solves the above problems by providing a method for measuring the condition of the network on a real-time basis to determine how many messages can be delivered in a given period. This method preferably includes counting the number of acknowledgment (ACK) messages returned, especially in comparison to the number of messages sent. The use of this count provides a basis for automatically regulating the communication retransmission rate according to the condition of the communication channel (that is, the number of ACKs received) without requiring any foreknowledge about the communication channels or any knowledge concerning the behavior of any other running application.

Accordingly, applications have several important advantages when the present invention is employed in a data processing network. For example, applications can now send messages over an unreliable communication channel with less overhead and with a reduction in the rate at which messages are dropped. The number of message retransmissions is thus also reduced, and the overall communication performance is enhanced. Message transmission is automatically and substantially continuously adapted to current network conditions. This also means that application programming can be made simpler with the chore of message transmission now being handled more capably by external programming using simpler protocols that relieve the application programs from the chores of acknowledgment monitoring, retry timing and message retransmission. by one or more changes to the switch port configuration.

SUMMARY OF THE INVENTION

A method for transmitting messages in a multinode data processing environment comprises several steps beginning with the placement of messages, to be sent from at least one application running on one of the nodes, onto a message queue along with an identifier for the transmitting application. A number of messages are selected for transmission based upon current indications of network transmission capacity. The selected messages are sent and the sending node then keeps track of the acknowledgment signals from the message recipients indicating that the messages that were sent have arrived. The present method then modifies the number of messages to be subsequently sent based upon the number of acknowledgments received in comparison to the number of messages sent. This comparison is thus used as an indication and predictor of current network capacity. The comparison is carried out either in the form of an absolute difference measure or, more preferably, in the form of a ratio comparison.

Accordingly, it is an object of the present invention to improve message transmission in parallel and distributed computing environments.

It is also an object of the present invention to provide an adaptive transmission protocol which not only makes full use of existing system capacity, but which also operates to insure that system capacity is not otherwise overloaded with retransmitted messages, especially freshly retransmitted ones.

It is a still further object of the present invention to avoid the requirement that application programs employ more complicated "reliable" protocols by providing a mechanism in which "unreliable" protocols are made to suffice.

It is yet another object of the present invention to provide a message transmission mechanism which readily permits sending a large number of messages to network peers while still reducing the possibility that one or more messages might have to be retransmitted at a later time.

It is still another object of the present invention to reduce the communication demands required for application programs and programmers.

It is a further object of the present invention to reduce the number of dropped messages in a networked data processing environment.

It is also an object of the present invention to improve overall communications performance, especially in distributed and parallel data processing networks.

It is yet another object of the present invention to reduce the time that it takes to send messages in a distributed or parallel data processing network.

It a still further object of the present invention to maximize the number of messages sent at one time by an application program.

It is also an object of the present invention to match the number of messages sent to the current capacity of the communication channel.

It is yet another object of the present invention to more precisely control a timer that governs how long a messaging system waits before attempting retransmissions of potentially dropped messages.

It is a still further object of the present invention to reduce the number of message retransmissions.

Lastly, but not limited hereto, it is an object of the present invention to expand the scope of applicability of so-called "unreliable" communication protocols.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

BRIEF DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 1 is a block diagram illustrating a communication model for sending messages between nodes in a data processing network;

FIG. 2 is a block diagram illustrating a preferred embodiment of the present invention in which a message queue is employed in conduction with an adaptive message driving protocol; and FIG. 3 is a block diagram illustrating the processing of received messages.

DETAILED DESCRIPTION OF THE INVENTION

As seen in FIG. 1, communication in a data processing network can be modeled as follows. When a commAgent on send node 100 (that is, send comma gent on node A) receives a send request from a sender (that is, from an application program), the send commAgent processes it and sends it to specified destination node 200 (for example, to receive comma gent on receiver node B). When the receive commAgent on destination node 200 (that is, node B) receives a message from the sender through the communication channel, the receive comma gent notifies the receiver (that is, notifies an application program) on its own node (Node B), and sends an acknowledgment (that is, ACK) to the sender node, here node 100 (Node A).

If the send commAgent on node A receives an ACK message from the receiver node B, the send commAgent sends a notification of the completion of the send request to the original sender and finishes (closes out) the send request. However, if the send commAgent on node A does not receive an ACK message in a given period (that is, until a retry request is issued, or until a retry timer elapses), the send commAgent retransmits the message to the destination node again (because the previously transmitted message may have been lost).

As implied in the communication model described above for FIG. 1, the following factors can affect overall communication performance:

if too many messages are sent to a communication channel, a certain number of messages may not reach the intended destination, particularly if the number of messages exceeds the capacity of the communication channel;

although a shorter interval for the retry request may reduce the total time to complete the send request, it may also cause more message traffic on the communication channel which may impact the performance degradation; and on the other hand, a longer retry interval my increase the total time to complete the send request, although under this strategy the immediate communication overhead is likely to be reduced.

The present invention enhances commAgent (that is, the send and receive comma gents) to regulate the number of messages from a transmission request and to also regulate the retry interval to achieve maximum throughput as well as to result in minimum communication overhead. In the present invention, which emphasizes one-to-all message broadcasting, the receive CommAgent simply sends the ACK (acknowledgment signal) and notifies the receiver application as soon as a message is received. FIG. 3 illustrates the operation of a preferred receive CommAgent.

FIG. 2 illustrates, in block diagram form, the structure for communication traffic regulation in accordance with the method and system of the present invention.

1. In the method of the present invention, send requests are initially queued onto message queue 300 before they are processed and sent instead of immediately transmitting the messages. This action prevents the transmission of a flood of messages into a channel with limited communication channel capacity.

2. A significant portion of the activity of the present invention is carried out using a software driver referred to herein as Message Driver 400 or Drive Messaging Engine 400. The Drive Messaging Engine 400 of the present invention selects a maximal possible number of messages (that is, MAXNUMMSGS) for transmission based upon the current communication capacity. Note that this parameter (MAXNUMMSGS) is adjusted in accordance with the currently determined network condition (for example, the number of ACKs received as compared to the number of messages sent out).

The MAXSIZE parameter is used to specify the maximum size of a message which can be requested to be sent over the communication channel. The requested message is split into several smaller messages if the requested message is too big:

number of the split messages =|requested message size|/MAXSIZE

As far as commAgents is concerned, the number of split messages is the true measure of the number of requested messages. The MAXNUMMSGS is the maximum number of split messages which can be sent at once.

There are several ways of adjusting MAXNUMMSGS, but the following is one of the methods preferred herein.

MAXNUMMSGS$_{next}$=MAXNUMMSGS$_{prev}$*(1−penalty+reward), where ack_miss_rate=(NumberOfACKs−NumberOfMsgsSent)/NumberOfMsgsSent penalty=0 if ack_miss_rate<epsilon (a small predefined number, eg. 0.1), or =ack_miss_rate/2, otherwise reward=value by which MAXNUMMSGS is increased.

Because of the way that it is defined, ack_miss_rate lies between 0 (indicating that all messages are delivered) to 1 (a value indicating that all messages are lost). In the above equation, ack_miss_rate is preferably divided by 2 so as to slow down the changes made to MAXNUMMSGS. For example, if MAXNUMMSGS is initially 100, and all of the messages are lost, then the next value for the MAXNUMMSGS parameter is 100*(1−½)=50.

The reward value is preferably computed as follows:

AvgMsgsPerSend=AccumulatedTotalMsgsSent/AccumulatedTotalStepsToSend reward=0 if a predefined value (e.g., 0.1)<(AvgMsgsPerSend/MAXNUMMSGS)<a predefined value (for example, 0.9), otherwise=(|AvgMsgsPerSend−MAXNUMMSGS|)/(2*MAXNUMMSGS).

Where the AccumulatedTotalMsgsSent parameter is the sum of all number of messages to be sent. This also accounts for the number of retries. The AccumulatedTotalStepsToSend parameter is the total number of sends. Therefore, AvgMsgsPerSends is the average number of messages per each send. The reward is added if the AvgMsgsPerSends is larger than a given percent (for example, 90%), or smaller than a given percent (for example, 10%) of the MAXNUMMSGS so that the deviation between two values is relatively small.

The above equations provide preferred examples of the "penalty and "reward" calculations which reflect a desired dependence on the condition of internodal communications. The present invention is not confined to these specific equations. Any set of other equations may be employed as long as they provide a penalty or reward based upon the system's success at message transmission and delivery.

3. The method of the present invention sends the selected messages to the communication channel, marks the message status as "Sent", and sets a retry interval timer to a current value (that is, RETRYINTERVAL) as determined by the following protocol. The RETRYINTERVAL is the initial retry interval timer. The actual retry interval timer is recomputed when the messages retransmission occurs.

The retry interval is increased when retransmission of messages in queue is attempted. At this time the value of RETRYINTERVAL is reset to the initial value, as when new messages are started. The adjustment of RETRYINTERVAL is expressed as follows. Initially, $N_{round}$=0, $t$=$t_0$ (where $t_0$ is initial value (RETRYINTERVAL), and $t$ is the retry interval).

The interval t remains the same as long as the messages are not retried. However, whenever messages retransmission is attempted:

$t$=$t$+$t_{delta}$, (where $t_{delta}$ is the incrementing value).

When all pending messages are sent and new messages are started:

$t$=$t_0$.

The underlying notion behind the above equations is to increase the interval duration when messages are not delivered. Therefore, the equation does not necessarily have to be expressed exactly as above. The relevant aspect is that the value is dynamically changed in dependence on message transmission success within the network.

4. Whenever the commAgent receives an ACK message from the destination, Drive Messaging Engine 400 marks the associated message status as "Done", and checks to see whether it has received all ACKs. If all ACKs are received, the originally requesting application is notified of the completion of the send request and the retry timer is reset. It should be noted here that there is some flexibility in implementation of the trigger for retry timer resetting. For situations in which several applications are running concurrently (the typical case), retry timer resetting may be made to be dependent on one or more applications. Such applications may be designated as being critical applications for purposes of resetting the retry timer. Additionally, the total number of acknowledgments may be accumulated for all running applications or an average number determined and if the average falls above a threshold value, the timer is reset.

a. (Reward) If all ACKs are received, enhancements are gradually made to the communication parameters: MAXNUMMSGS and the retry interval are increased toward greater communication channel capacity, that is, MAXNUMMSGS is increased and the retry interval is decreased. The retry interval will be reset to the original such as retry_interval=$t_0$. The reward is computed as:

AvgMsgsPerSend=AccumulatedTotalMsgsSent/AccumulatedTotalStepsToSend reward=0 if a predefined value (e.g., 0.1)<(AvgMsgsPerSend/MAXNUMMSGS)<a predefined value (e.g., 0.9)=(|AvgMsgsPerSend−MAXNUMMSGS|)/(2*MAXNUMMSGS), otherwise as described above.

5. When the retry timer elapses some of the messages may not have been sent due to limitations on the maximum possible number of messages in a given transmission (that is, some unsent messages may still be left in the message queue). In this case the present method selects the next set of messages and sends them out.

6. When the retry timer elapses because some ACKs have not been received after the transmission of all messages from the queue has been attempted, the present method evaluates the network condition and adjusts the communication parameters—maximum number of messages per transmission (MAXNUMMSGS) and the retry interval (RETRYINTERVAL).

a. (Penalty) If the number of missing ACKs is too high, that is if the number is greater than a given number or if ack_miss_rate is greater than, say, 0.1 (representing a miss rate of 50 messages out of 500 message transmissions), first the MAXNUMMSGS parameter is gradually reduced, and then the retry interval (RETRYINTERVAL) is increased if the MAXNUMSGS parameter has already reached a given minimum predefined value, or if retries still occur. For example, the following equations specify one of the possible, and a preferred, methods for adjusting these parameters in the light of message transmission failure:

$$MAXNUMMSGS_{next}=MAXNUMMSGS_{prv}*(1-penalty)$$

$$penalty=ack\_miss\_rate/2$$

And $$t=t+t_{delta}, \text{ (where } t_{delta} \text{ is the incrementing value)}$$

when the messages are retried, or when MAXNUMMSGS falls below a predefine value (e.g., $MAXNUMMSGS_{min}$). In this way, the number of messages per transmission and the retry interval are adjusted according to network conditions so as to reduce communication overhead.

The present invention is preferably employed in a data processing system such as the pSeries processors developed and marketed by International Business Machines, Inc., the assignee of the present invention. The preferred systems include a plurality of data processing nodes which communicate with one another via a switch using a publicly defined Message Passing Interface (MPI). Thus, the primary interchange of information from node-to-node is via the exchange of messages directed to defined sets of other nodes. As developed and marketed, these nodes are capable of being formed into defined groups of nodes so that applications running on these nodes are enabled to perform parallel and distributed data processing tasks. In particular, these publicly available systems include programming referred to as Group Services which permit application programs to establish groups of nodes, to control membership in these groups and to utilize various group functions. Group Services is best viewed as a utility that runs in conjunction with an underlying operating system. Group Services programming also controls the node-to-node transmission of its messages as described herein. The present invention is therefore embodied in Group Services software system to enhance situations such as those described below.

Normally, when Group Services performs a transmission protocol which requires all nodes to respond to it on a very large and heavily loaded system (for example, 500 nodes), Group Services first sends the protocol messages to all of the designated nodes and waits for the responses. Group Services keeps the messages sent to unresponsive nodes for a given time interval prior to retransmission. However, in some circumstances, because the communication channel is already at capacity overflow due to the activities of other applications, many Group Services messages are, at least temporarily, lost. Furthermore, repeated retransmission adds to the increased overhead of the communication channel and further increases the message drop rate. Therefore, the normal protocol may not finish in a reasonable time, or may even further slow the performance of the application which uses Group Services. However, using the protocol of the present invention, Group Services sends the requested messages in several steps and adjusts the retry interval so that it can improve the communication performance without negatively affecting the communication channel.

Therefore, use of the method of the present invention regulate communication traffic provides application programs with the following advantages: (1) a reduction in communication overhead by adjusting the rate of the sending messages; and (2) an overall improvement in communication performance.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for transmitting messages in a multinode data processing environment, said method comprising the steps of:

placing messages, to be sent from at least one application, in a message queue along with an identifier for the transmitting application;

selecting a number of messages to be sent based upon current indications of network transmission capacity;

sending said selected messages;

receiving acknowledgments that said sent messages have arrived; and modifying the number of messages to be sent based upon the number of acknowledgments received in comparison to the number of messages sent as used an indication of current network capacity.

2. The method of claim 1 further including modifying the time interval used to determine when a message is to be retransmitted following lack of an acknowledgment.

3. The method of claim 1 in which the number of messages to be sent is increased when the number of acknowledgments received exceeds a predetermined value.

4. The method of claim 1 in which the number of messages to be sent is decreased when the number of acknowledgments received falls below a predetermined value.

5. The method of claim 1 in which the time interval used to determine when a message is to be retransmitted following lack of an acknowledgment is decreased when the number of acknowledgments received exceeds a predetermined value.

6. The method of claim 1 in which the time interval used to determine when a message is to be retransmitted following lack of an acknowledgment is increased when the number of acknowledgments received exceeds a predetermined value.

7. A multinode data processing system comprising:

at least three nodes;

an internode communication link connecting said at least three nodes;

a message queue within at least one of said nodes; and programming on said at least one node for transmitting messages from said queue and for monitoring transmission acknowledgments from others of said nodes so as to adjust a transmission retry interval and a parameter which determines the maximum number of messages to be transmitted from said queue.

* * * * *